United States Patent
Kikawa et al.

(10) Patent No.: US 7,201,046 B2
(45) Date of Patent: Apr. 10, 2007

(54) FLOWMETER WITH RESISTOR HEATER

(75) Inventors: Hiromu Kikawa, Hitachinaka (JP); Shinya Igarashi, Naka (JP); Masayuki Kozawa, Hitachinaka (JP); Naoki Saitou, Tokai (JP); Takayuki Saitou, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 10/468,080

(22) PCT Filed: Feb. 21, 2001

(86) PCT No.: PCT/JP01/01222

§ 371 (c)(1),
(2), (4) Date: Aug. 15, 2003

(87) PCT Pub. No.: WO02/066936

PCT Pub. Date: Aug. 29, 2002

(65) Prior Publication Data

US 2004/0060353 A1  Apr. 1, 2004

(51) Int. Cl.
G01F 1/68 (2006.01)

(52) U.S. Cl. .................... 73/202.5; 73/204.22

(58) Field of Classification Search .............. 73/202.5, 73/204.11, 204.22, 204.25
See application file for complete search history.

(56) References Cited

U.S. PATENT DOCUMENTS

| | | | |
|---|---|---|---|
| 4,478,075 A | 10/1984 | Oyama et al. | 73/204.22 |
| 5,325,712 A | 7/1994 | Tsutsui et al. | 73/118.2 |
| 5,404,753 A | 4/1995 | Hecht et al. | 73/118.2 |
| 5,696,321 A * | 12/1997 | Igarashi et al. | 73/202.5 |
| 5,780,735 A | 7/1998 | Kadohiro et al. | |
| 6,658,931 B1 * | 12/2003 | Plumb et al. | 73/204.15 |
| 6,675,644 B2 * | 1/2004 | Yamakawa et al. | 73/204.26 |

FOREIGN PATENT DOCUMENTS

| | | |
|---|---|---|
| DE | EP 0 708 315 A2 * | 4/1996 |
| EP | 708315 | 4/1996 |
| JP | 60-36916 | 2/1985 |
| JP | 6-265385 | 9/1994 |
| JP | 11-14421 | 1/1999 |

* cited by examiner

*Primary Examiner*—Harshad Patel
(74) *Attorney, Agent, or Firm*—Mattingly, Stanger, Malur & Brundidge, P.C.

(57) ABSTRACT

An air temperature detector 12 is disposed close to an auxiliary passage sidewall 15, which has an auxiliary passage wall hole 9 formed near the air temperature detector 12. A heat-sensitive resistor 13 is also disposed close to the auxiliary passage sidewall 15, which has an auxiliary passage wall hole 10 formed near the heat-sensitive resistor 13. Further, a resistor heater 14 is disposed close to an auxiliary passage sidewall 16, which has an auxiliary passage wall hole 11 near the resistor heater 14.

17 Claims, 8 Drawing Sheets

FLOWMETER WITH RESISTOR HEATER

TECHNICAL FIELD

The present invention relates to an air flowmeter with a resistor heater for measuring the amount of intake air flowing through an intake passage of an internal combustion engine, and more particularly to a flowmeter with a resistor heater, which is suitable for measuring the flow rate of air sucked into an automobile engine.

BACKGROUND ART

It is known that conventional flowmeters with resistor heaters have various measurement errors. One of those measurement errors is a temperature characteristic error that occurs upon a detecting device, such as a resistor heater, heated by heat transmitted through a structure of the flowmeter with the resistor heater. Heat generating sources typically include 1) an engine and an exhaust pipe, and 2) a power transistor forming a signal amplification circuit in an electronic circuit section of the flowmeter with the resistor heater. There are possibly two heat transmission routes, i.e., A) one along which heat is transmitted through the structure of the flowmeter with the resistor heater and then directly reaches the detector, and B) the other along which heat is transmitted through the structure of the flowmeter with the resistor heater to raise the temperature of an auxiliary passage wall, whereby the temperature of an airflow in contact with the auxiliary passage wall rises and resulted heat reaches the detecting device.

When heat is transmitted to a temperature sensor for measuring an air temperature, the temperature detected by the temperature sensor is higher than the ambient air temperature by the amount of heat transmitted to the temperature sensor, and the amount of the transmitted heat directly produces an error of the measured temperature. When heat is transmitted to a resistor heater, the necessity of electrically heating the resistor heater is reduced in the amount of heat detected by the detecting device, and the output of the flowmeter with the resistor heater is reduced correspondingly. This is because the flowmeter with the resistor heater operates such that the temperature of the resistor heater is controlled to be always held at a fixed value higher than the temperature of a heat-sensitive resistor at all times and an electric power required for that control is taken out as a measured value. When heat is transmitted to the heat-sensitive resistor, the amount by which the resistor heater must be heated is increased in the amount of heat received by the detecting device, and the output of the flowmeter with the resistor heater is increased correspondingly. In such a way, heat-induced errors occur in the flowmeters with the resistor heaters.

In the conventional flowmeters with resistor heaters, it is known to reduce or adjust the thermal effect upon the detecting device, such as the resistor heater, through structural members as disclosed in, e.g., JP, A 60-36916. Further, in the flowmeter disclosed in JP, A 60-36916, the shape and the material of a terminal supporting the detecting device are changed for adjustment of the thermal effect from the structural members.

DISCLOSURE OF THE INVENTION

However, the solution of changing the shape and the material of the terminal accompanies problems, such as a deterioration of weldability with the detecting device when the material of a detecting device support is changed, and a reduction of productivity when the support has a complicated structure.

An object of the present invention is to provide a flowmeter with a resistor heater, which has increased productivity.

To achieve the above object, the present invention provides a flowmeter with a resistor heater, comprising a detector for detecting an air flow rate, a heat-sensitive resistor for measuring an ambient temperature to compensate a heated temperature of the detector, and an auxiliary passage in which the detector and the heat-sensitive resistor are arranged, wherein a hole is formed in a wall of the auxiliary passage near each or one of the detector and the heat-sensitive resistor.

With that construction, an influence of temperature upon the detector or the heat-sensitive resistor can be reduced just by changing the position of the hole, and productivity can be improved.

BEST MODE FOR CARRYING OUT THE INVENTION

The construction of a flowmeter with a resistor heater according to one embodiment of the present invention will be described below with reference to FIGS. 1 to 11.

Figure 1:
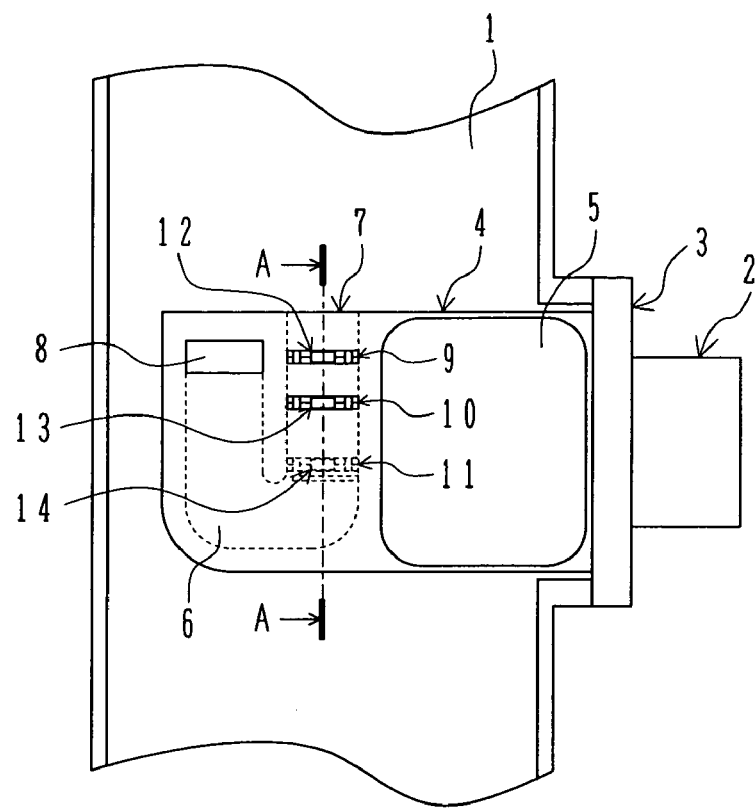
FIG. 1 is a longitudinal seeing-through sectional view showing an overall construction of a flowmeter with a resistor heater according to one embodiment of the present invention.
Figure 2:
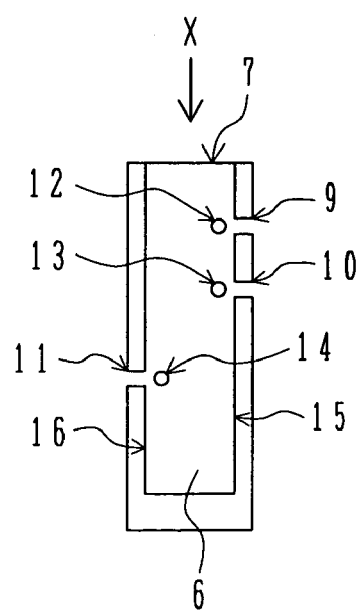
FIG. 2 is a longitudinal sectional view of an auxiliary passage of the flowmeter with the resistor heater according to one embodiment of the present invention.

First, a description is made of an overall construction of the flowmeter with the resistor heater according to one embodiment of the present invention with reference to FIGS. 1 and 2.

FIG. 1 is a longitudinal seeing-through sectional view showing the overall construction of the flowmeter with the resistor heater according to one embodiment of the present invention, and FIG. 2 is a longitudinal sectional view of an auxiliary passage of the flowmeter with the resistor heater according to one embodiment of the present invention, i.e., a sectional view taken along the line A—A in FIG. 1.

As shown in FIG. 1, a module housing 4 of the flowmeter with the resistor heater is mounted to an intake passage 1 of an automobile internal combustion engine through a module flange 3. A connector 2 for electrical connection to the exterior is provided on the module flange 3. An auxiliary passage 6 is formed in a fore end portion of the module housing 4. An air temperature detector 12, a heat-sensitive resistor 13, and a resistor heater 14 are disposed within the auxiliary passage 6.

A part of air sucked to the internal combustion engine through the intake passage 1 flows into the auxiliary passage 6 through an auxiliary passage inlet 7 and then flows out to the intake passage 1 through an auxiliary passage outlet 8. The temperature of the air having flown into the auxiliary passage 6 is detected by the air temperature detector 12. The flow rate of the air having flown into the auxiliary passage 6 is detected by the resistor heater 14, and the temperature of the intake air is compensated using the heat-sensitive resistor 13.

The air temperature detector 12, the heat-sensitive resistor 13, and the resistor heater 14 are electrically connected to an electronic circuit disposed within the module housing 4. The electronic circuit is connected to the exterior through the connector 2 and outputs a detected signal of the air flow rate and a detected signal of the air temperature to the exterior. The electronic circuit disposed within the module housing 4 is enclosed by a cover 5 in a sealed condition.

Then, as shown in FIG. 2, the air temperature detector 12 is disposed close to an auxiliary passage sidewall 15, which has an auxiliary passage wall hole 9 formed near the air temperature detector 12. The heat-sensitive resistor 13 is also disposed close to the auxiliary passage sidewall 15, which has an auxiliary passage wall hole 10 formed near the heat-sensitive resistor 13. Further, the resistor heater 14 is disposed close to an auxiliary passage sidewall 16, which has an auxiliary passage wall hole 11 near the resistor heater 14.

Moreover, as shown in FIG. 2, the air temperature detector 12 and the heat-sensitive resistor 13 are both arranged on the same plane with respect to an airflow X. On the other hand, the resistor heater 14 is arranged downstream of the air temperature detector 12 and the heat-sensitive resistor 13 in the direction of the airflow X on a plane different from the plane on which the air temperature detector 12 and the heat-sensitive resistor 13 are both arranged. Because of the air temperature detector 12 and the heat-sensitive resistor 13 each detecting the temperature of the inflow air, if the resistor heater 14 is arranged upstream of them, the temperature detection cannot be accurately performed with the presence of heat generated by the resistor heater 14. For that reason, the resistor heater 14 is arranged downstream of the air temperature detector 12 and the heat-sensitive resistor 13. Also, if a device disturbing the airflow is arranged upstream of the resistor heater 14, the air flow rate cannot be accurately measured. For that reason, the resistor heater 14 is arranged on the plane different with respect to the airflow X from the plane on which the air temperature detector 12 and the heat-sensitive resistor 13 are both arranged.

Next, the dimensions and shapes of the auxiliary passage wall holes formed in the flowmeter with the resistor heater according to this embodiment will be described with reference to FIGS. 3 and 4.

Figure 3:
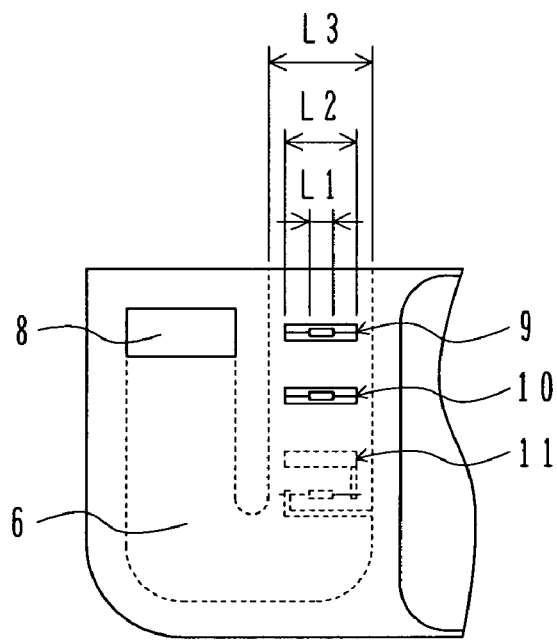
FIG. 3 is a longitudinal seeing-through sectional view showing a principal construction of the flowmeter with the resistor heater according to one embodiment of the present invention.
Figure 4:
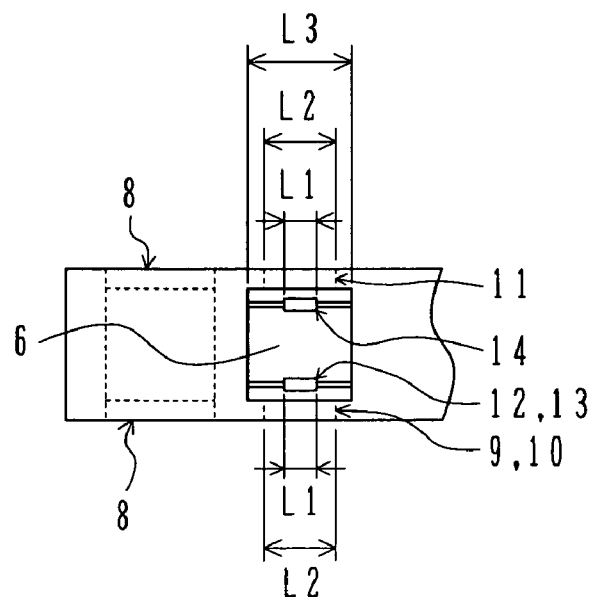
FIG. 4 is a plan view of a principal part of the flowmeter with the resistor heater according to one embodiment of the present invention.

FIG. 3 is a longitudinal seeing-through sectional view showing a principal construction of the flowmeter with the resistor heater according to one embodiment of the present invention, and FIG. 4 is a plan view of a principal part of the flowmeter with the resistor heater according to one embodiment of the present invention. Note that the same characters in FIGS. 1 and 2 denote the same components.

As shown in FIG. 3, the auxiliary passage wall holes 9, 10 and 11 each have a shape of a rectangular slit. Then, as shown in FIGS. 3 and 4, each of the auxiliary passage wall holes 9, 10 and 11 formed respectively near the air temperature detector 12, the heat-sensitive resistor 13 and the resistor heater 14 has a transverse width L2 that is set not smaller than a transverse width L1 of each of the air temperature detector 12, the heat-sensitive resistor 13 and the resistor heater 14 (L2≧L1), but not greater than a width L3 of the auxiliary passage 6 (L2≦L3). Incidentally, the auxiliary passage wall holes 9, 10 and 11 are each not limited to a slit shape, and may be formed into, for example, an elliptic or circular shape.

The above-described construction in which the air temperature detector 12, the heat-sensitive resistor 13, and the resistor heater 14 are arranged in the auxiliary passage 6 causes two problems as follows.

1) When detecting devices, such as the air temperature detector 12, the heat-sensitive resistor 13 and the resistor heater 14, are disposed close to the auxiliary passage walls 15, 16, the airflow flowing through the auxiliary passage 6 passes primarily through an area in which flow resistance is relatively small, and therefore the flow rate of the air flowing between the detecting device and the auxiliary passage wall tends to reduce to a very small value. Such a tendency reduces the effect of cooling the detecting device heated by heat coming from the exterior or heat generated by a power transistor section of the control circuit, which is achieved with the airflow flowing through the auxiliary passage.

2) Since the heat transmitted from the exterior or the power transistor section is transmitted through structural members of the air flowmeter, the temperature of the auxiliary passage wall itself also rises. With this regard, the airflow flowing through the auxiliary passage 6 while contacting the auxiliary passage walls 15, 16 is heated and the temperature of the air residing within a certain distance from each auxiliary passage wall rises. An area in which the air temperature rises is gradually enlarged starting from a most upstream end point of the auxiliary passage wall. If the detecting device, such as the resistor heater, is disposed within the area in which the air temperature rises, an error due to temperature occurs as in the case where the heat transmitted through the structural members directly raises the temperature of the detecting device.

Figure 5:
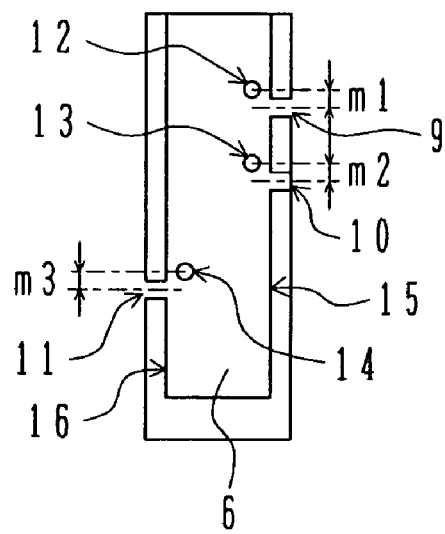
FIG. 5 is a longitudinal sectional view of the auxiliary passage of the flowmeter with the resistor heater according to one embodiment of the present invention.

Next, a description is made of the dimensions and shapes of the auxiliary passage wall holes according to this embodiment, which are suitable for enhancing the cooling effect by increasing the flow speed so as to cancel off a decrease of the cooling effect described in the above (1), with reference to FIG. 5.

FIG. 5 is a longitudinal sectional view of the auxiliary passage of the flowmeter with the resistor heater according to one embodiment of the present invention. Note that the same characters in FIGS. 1 to 4 denote the same components.

To increase the flow speed of the airflow flowing between the air temperature detector 12 and the auxiliary passage wall 15, the auxiliary passage wall hole 9 formed near the air temperature detector 12 is offset a distance m1 downstream of the air temperature detector 12 in the direction of the airflow in the auxiliary passage 6. The offset amount m1 means the distance between the center of the air temperature detector 12 and the center of the auxiliary passage wall hole 9 in the direction of the airflow. By forming the auxiliary passage wall hole 9 with the offset distance m1 in the downstream direction of the airflow in the auxiliary passage 6, a part of the air flowing in through the auxiliary passage inlet 7 is caused to flow out through the auxiliary passage wall hole 9. As a result, the flow rate of the air flowing between the air temperature detector 12 and the auxiliary passage wall 15 increases and so does the flow speed of the air around the air temperature detector 12. It is hence possible to increase the effect of cooling the detecting device heated by, e.g., heat coming from the exterior, which is achieved with the airflow flowing through the auxiliary passage.

Likewise, to increase the flow speed of the airflow flowing between the heat-sensitive resistor 13 and the auxiliary passage wall 15, the auxiliary passage wall hole 10 formed near the heat-sensitive resistor 13 is offset a distance m2 downstream of the heat-sensitive resistor 13 in the direction of the airflow in the auxiliary passage 6. By forming the auxiliary passage wall hole 10 with the offset distance m2 in the downstream direction of the airflow in the auxiliary passage 6, the flow rate of the air flowing between the heat-sensitive resistor 13 and the auxiliary passage wall 15 increases and so does the flow speed of the air around the heat-sensitive resistor 13. It is hence possible to increase the effect of cooling the detecting device heated by, e.g., heat coming from the exterior, which is achieved with the airflow flowing through the auxiliary passage.

Further, to increase the flow speed of the airflow flowing between the resistor heater 14 and the auxiliary passage wall 16, the auxiliary passage wall hole 11 formed near the resistor heater 14 is offset a distance m3 downstream of the resistor heater 14 in the direction of the airflow in the auxiliary passage 6. By forming the auxiliary passage wall hole 11 with the offset distance m3 in the downstream direction of the airflow in the auxiliary passage 6, the flow rate of the air flowing between the resistor heater 14 and the auxiliary passage wall 16 increases and so does the flow speed of the air around the resistor heater 14. It is hence possible to increase the effect of cooling the detecting device heated by, e.g., heat coming from the exterior, which is achieved with the airflow flowing through the auxiliary passage.

The offset amounts m1, m2 and m3 are each set to be, e.g., in the range of −1 mm to +3 mm. Here, the sign (+) means the offset amount in the downstream direction of the airflow from the detecting device, and the sign (−) means the offset amount in the upstream direction of the airflow from the detecting device. The offset amounts m1, m2 and m3 must be each changed depending on the dimension, etc. of the detecting device, and a practical example of those offset amounts will be described later with reference to FIG. 7.

Figure 6:
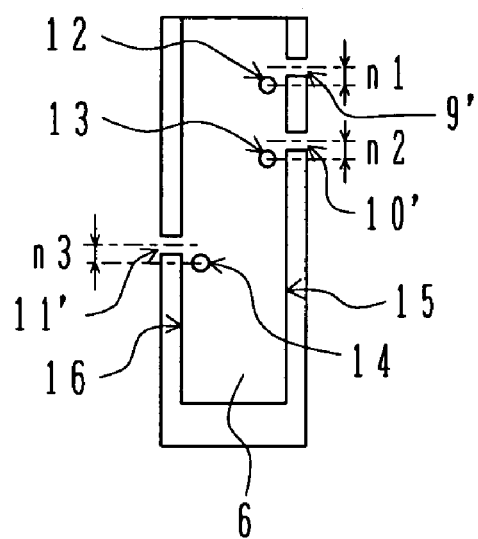
FIG. 6 is a longitudinal sectional view of the auxiliary passage of the flowmeter with the resistor heater according to one embodiment of the present invention.

Next, a description is made of the dimensions and shapes of the auxiliary passage wall holes according to this embodiment, which are suitable for dividing a temperature boundary layer to avoid the temperature error caused by a temperature rise of the auxiliary passage wall described in the above (2), with reference to FIG. 6.

FIG. 6 is a longitudinal sectional view of the auxiliary passage of the flowmeter with the resistor heater according to one embodiment of the present invention. Note that the same characters in FIGS. 1 to 4 denote the same components.

To reduce the effect of heat of the auxiliary passage wall 15, the temperature boundary layer is divided such that the heat generated from the auxiliary passage wall 15 will not be transmitted to the air temperature detector 12. To that end, an auxiliary passage wall hole 9' formed near the air temperature detector 12 is offset a distance n1 upstream of the air temperature detector 12 in the direction of the airflow in the auxiliary passage 6. The offset amount n1 means the distance between the center of the air temperature detector 12 and the center of the auxiliary passage wall hole 9' in a direction opposed to the direction of the airflow. By forming the auxiliary passage wall hole 9' with the offset distance n1 in the upstream direction of the airflow in the auxiliary passage 6, the temperature boundary layer is divided by the air flowing in through the auxiliary passage wall hole 9' so that the heat from the auxiliary passage wall 15 is less transmittable to the air temperature detector 12. As a result, it is possible to reduce the influence of the heat from the auxiliary passage wall 15 and to lower the temperature of the air around the detecting device.

Likewise, to reduce the influence of the heat from the auxiliary passage wall 15 upon the heat-sensitive resistor 13, an auxiliary passage wall hole 10' formed near the heat-sensitive resistor 13 is offset a distance n2 upstream of the heat-sensitive resistor 13 in the direction of the airflow in the auxiliary passage 6. By forming the auxiliary passage wall hole 10' with the offset distance n2 in the upstream direction of the airflow in the auxiliary passage 6, the temperature boundary layer is divided by air flowing in through the auxiliary passage wall hole 10' so that the heat from the auxiliary passage wall 15 is less transmittable to the heat-sensitive resistor 13. As a result, it is possible to reduce the influence of the heat from the auxiliary passage wall 15.

Further, to reduce the influence of the heat from the auxiliary passage wall 16 upon the resistor heater 14, an auxiliary passage wall hole 11' formed near the resistor heater 14 is offset a distance n3 upstream of the resistor heater 14 in the direction of the airflow in the auxiliary passage 6. By forming the auxiliary passage wall hole 11' with the offset distance n3 in the upstream direction of the airflow in the auxiliary passage 6, the temperature boundary layer is divided by air flowing in through the auxiliary passage wall hole 11' so that the heat from the auxiliary passage wall 16 is less transmittable to the resistor heater 14. As a result, it is possible to reduce the influence of the heat from the auxiliary passage wall 16.

The offset amounts n1, n2 and n3 are each set to be, e.g., in the range of 0 mm to +5 mm. Here, the sign (+) means the offset amount in the upstream direction of the airflow from the detecting device. The offset amounts n1, n2 and n3 must be each changed depending on the dimension, etc. of the detecting device, and a practical example of those offset amounts will be described later with reference to FIG. 7.

Figure 7:
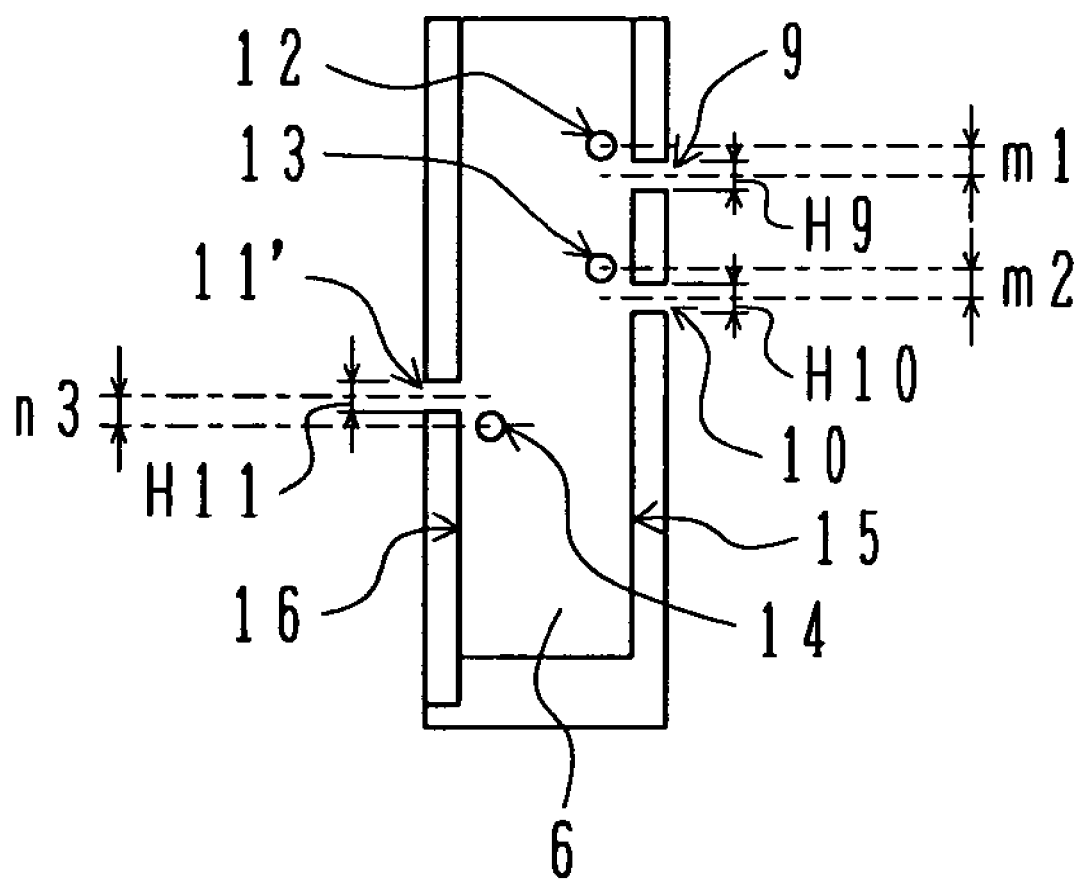
FIG. 7 is a longitudinal sectional view of the auxiliary passage of the flowmeter with the resistor heater according to one embodiment of the present invention.

Next, a description is made of the dimensions and shapes of the auxiliary passage wall holes according to this embodiment, which are suitable for overcoming the above-described problems (1) and (2), with reference to FIG. 7.

FIG. 7 is a longitudinal sectional view of the auxiliary passage of the flowmeter with the resistor heater according to one embodiment of the present invention. Note that the same characters in FIGS. 1 to 6 denote the same components.

The auxiliary passage wall hole 9 formed near the air temperature detector 12 is offset the distance m1 downstream of the air temperature detector 12 in the direction of the airflow in the auxiliary passage 6 to increase the flow speed of the airflow flowing between the air temperature detector 12 and the auxiliary passage wall 15. With this arrangement, the flow rate of the air flowing between the air temperature detector 12 and the auxiliary passage wall 15 is increased, thus enabling the airflow flowing through the auxiliary passage to cool the air temperature detector 12 heated by, e.g., heat coming from the exterior.

Assuming here that the length L1(12) of the air temperature detector 12 is 2.5 mm and the width L3 of the auxiliary passage 6 is 9.5 mm, the transverse width L2(9) of the auxiliary passage wall hole 9 is set to 9.5 mm so as to satisfy the relationship of $L1(12) \leq L2(9) \leq L3$.

Also, assuming that the air temperature detector 12 has a cylindrical shape with a diameter φ12 of 1.0 mmφ and the auxiliary passage wall hole 9 has a height H(9) of 1.0 mm, the offset amount m1 is set to +0.5 mm.

The auxiliary passage wall hole 10 formed near the heat-sensitive resistor 13 is offset the distance m2 downstream of the heat-sensitive resistor 13 in the direction of the airflow in the auxiliary passage 6 to increase the flow speed of the airflow flowing between the heat-sensitive resistor 13 and the auxiliary passage wall 15. With this arrangement, the flow rate of the air flowing between the heat-sensitive resistor 13 and the auxiliary passage wall 15 is increased, thus enabling the airflow flowing through the auxiliary passage to cool the heat-sensitive resistor 13 heated by, e.g., heat coming from the exterior.

Assuming here that the length L1(13) of the heat-sensitive resistor 13 is 2.0 mm and the width L3 of the auxiliary passage 6 is 9.5 mm, the transverse width L2(10) of the auxiliary passage wall hole 10 is set to 8.5 mm so as to satisfy the relationship of $L1(13) \leq L2(10) \leq L3$.

Also, assuming that the heat-sensitive resistor 13 has a cylindrical shape with a diameter φ13 of 0.8 mmφ and the auxiliary passage wall hole 10 has a height H(10) of 1.5 mm, the offset amount m2 is set to +2.5 mm.

The auxiliary passage wall hole 11' formed near the resistor heater 14 is offset the distance n3 upstream of the resistor heater 14 in the direction of the airflow in the auxiliary passage 6 to divide the temperature boundary layer by air flowing in through the auxiliary passage wall hole 11'. With this arrangement, the heat from the auxiliary passage wall 16 is less transmittable to the resistor heater 14, and the influence of the heat from the auxiliary passage wall 16 can be reduced.

Assuming here that the length L1(14) of the resistor heater 14 is 2.0 mm and the width L3 of the auxiliary passage 6 is 9.5 mm, the transverse width L2(11') of the auxiliary passage wall hole 11' is set to 8.5 mm so as to satisfy the relationship of $L1(14) \leq L2(11') \leq L3$.

Also, assuming that the resistor heater 14 has a cylindrical shape with a diameter φ14 of 0.5 mmφ and the auxiliary passage wall hole 11' has a height H(11') of 1.0 mm, the offset amount n3 is set to +2.5 mm.

Stated another way, in the example shown in FIG. 7, the auxiliary passage wall holes 9, 10 are formed to be offset respectively the distances m1, m2 downstream of the air temperature detector 12 and the heat-sensitive resistor 13 in the direction of the airflow in the auxiliary passage 6, whereby the detectors 12, 13 are cooled by the air flowing through the auxiliary passage. On the other hand, the auxiliary passage wall hole 11' formed near the resistor heater 14 is offset the distance n3 in the upstream direction of the airflow in the auxiliary passage 6, whereby the influence of the heat from the auxiliary passage wall 16 is reduced.

Next, a description is made of the effect of reducing the influence of temperature, which is resulted from the construction shown in FIG. 7, with reference to FIGS. 8 to 11.

FIGS. 8 to 11 are each an explanatory view for explaining the effect of reducing the influence of temperature in the flowmeter with the resistor heater according to one embodiment of the present invention.

Figure 8:
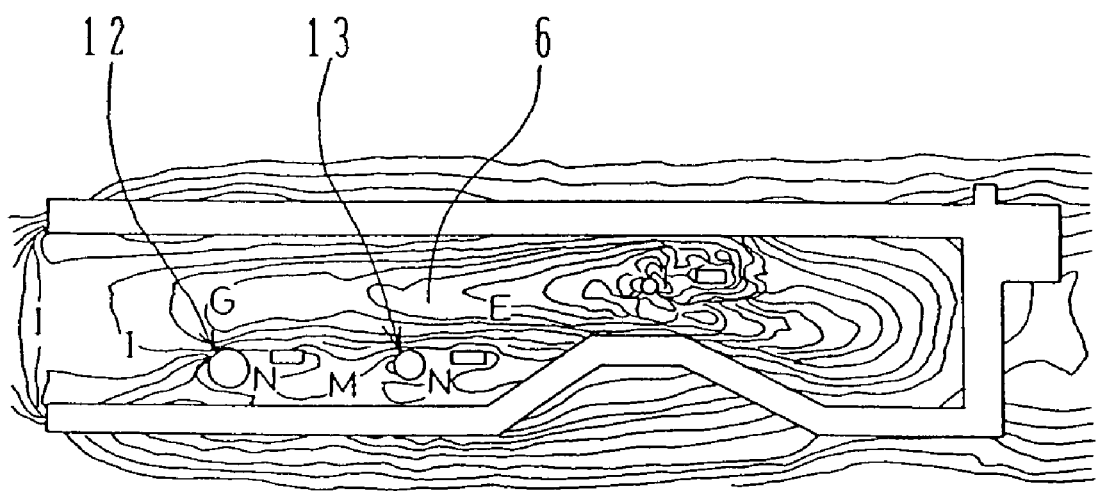
FIG. 8 is an explanatory view for explaining the effect of reducing an influence of temperature in the flowmeter with the resistor heater according to one embodiment of the present invention.
Figure 9:
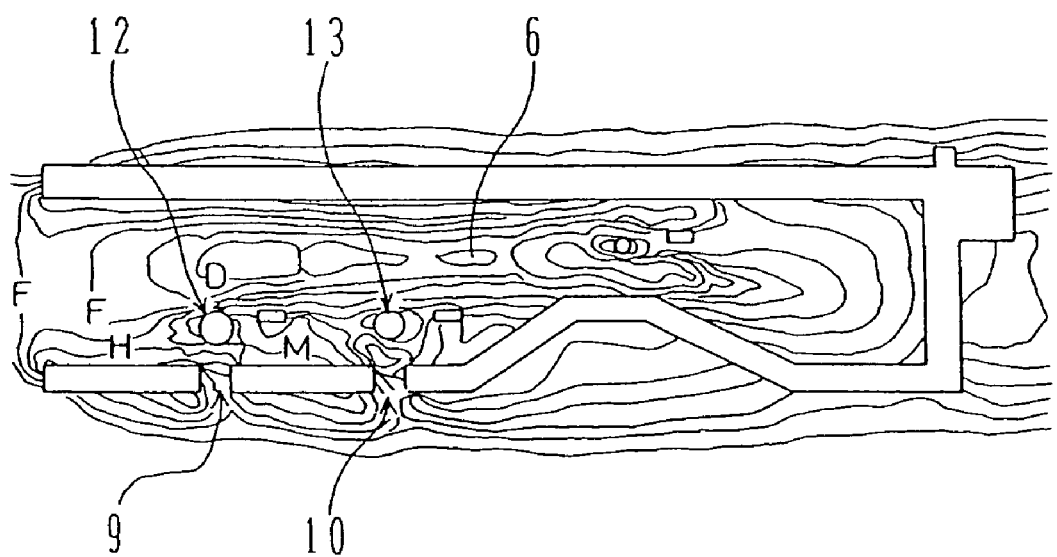
FIG. 9 is an explanatory view for explaining the effect of reducing an influence of temperature in the flowmeter with the resistor heater according to one embodiment of the present invention.

FIGS. 8 and 9 show distributions of air flow speed depending on the absence and presence of the auxiliary passage wall holes 9, 10, and they show results of analyzing distributions of air flow speed in the auxiliary passage, which were obtained by verifying the effect of the auxiliary passage wall holes with the CAE analysis.

FIG. 8 shows the flow speed distribution resulting in the absence of the auxiliary passage wall holes 9, 10. As shown in FIG. 8, when no auxiliary passage wall holes are formed near the air temperature detector 12 and the heat-sensitive resistor 13, the air flow speed is much lower in the gaps formed between the air temperature detector 12 and the heat-sensitive resistor 13 and the auxiliary passage wall 15, to which those detecting devices are positioned close, than in a central area of the auxiliary passage 6. Therefore, the effect of cooling the air temperature detector 12 and the heat-sensitive resistor 13, which is achieved with the airflow flowing through the auxiliary passage, is reduced by half.

On the other hand, FIG. 9 shows the flow speed distribution resulting when the auxiliary passage wall holes 9, 10 are formed. With the presence of the auxiliary passage wall holes 9, 10 near the air temperature detector 12 and the heat-sensitive resistor 13, as shown in FIG. 9, the airflow is caused to flow into the auxiliary passage wall holes 9, 10 formed in the auxiliary passage wall 15 near the air temperature detector 12 and the heat-sensitive resistor 13 in such a way that relatively fast airflows contact substantially overall peripheries of both the detecting devices. As a result, the effect of cooling the air temperature detector 12 and the heat-sensitive resistor 13, which is achieved with the airflow flowing through the auxiliary passage, is increased.

Figure 10:
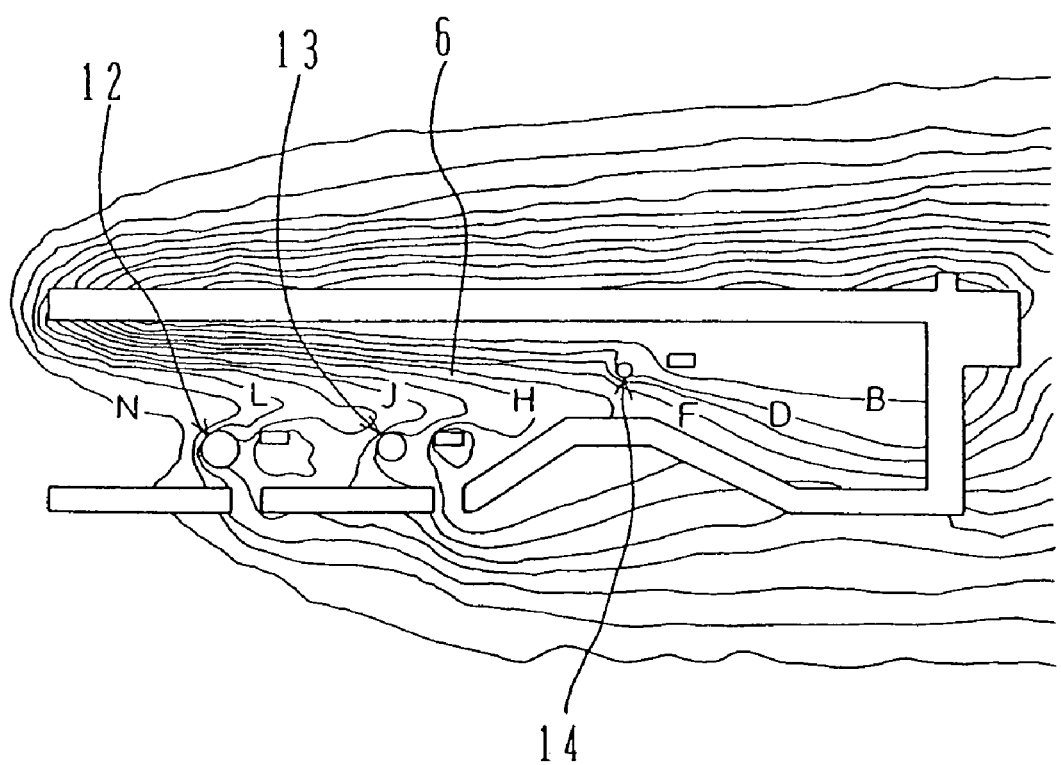
FIG. 10 is an explanatory view for explaining the effect of reducing an influence of temperature in the flowmeter with the resistor heater according to one embodiment of the present invention.
Figure 11:
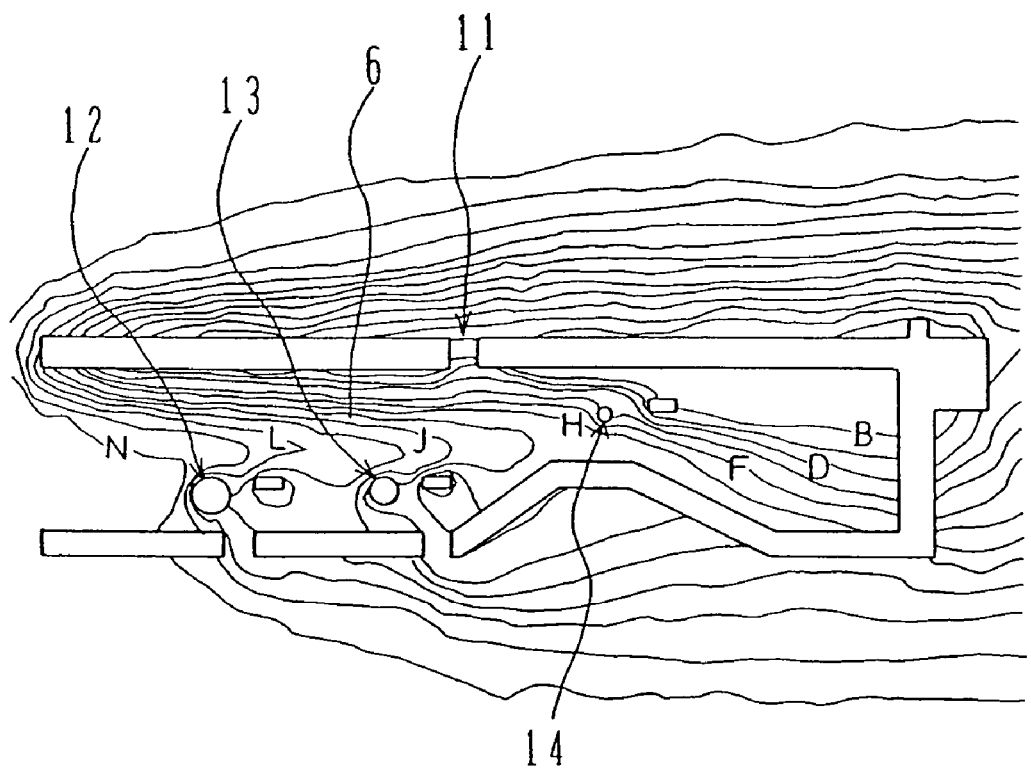
FIG. 11 is an explanatory view for explaining the effect of reducing an influence of temperature in the flowmeter with the resistor heater according to one embodiment of the present invention.

Further, FIGS. 10 and 11 show temperature distributions depending on the absence and presence of the auxiliary passage wall hole 11', and they show results of analyzing distributions of air temperature in the auxiliary passage 6, which were obtained by verifying the effect of the auxiliary passage wall hole with the CAE analysis. FIG. 10 shows the flow speed distribution resulting in the absence of the auxiliary passage wall hole 11'.

As shown in FIG. 10, when no auxiliary passage wall hole is formed near the resistor heater 14, the airflow flowing through the auxiliary passage 6 is heated by the auxiliary passage wall 16, which is in turn heated by heat coming from the exterior or generated by the electronic circuit, and then forms a flow having high temperature in the vicinity of the auxiliary passage wall 16. The airflow thus heated by the auxiliary passage wall 16 reaches the resistor heater 14.

Consequently, the resistor heater 14 is affected by the heat from the auxiliary passage wall 16, thereby causing an error due to temperature.

On the other hand, FIG. 11 shows the temperature distribution resulting when the auxiliary passage wall hole 11' is formed. With the presence of the auxiliary passage wall hole 11' near the resistor heater 14, as shown in FIG. 11, an airflow generated in the vicinity of the auxiliary passage wall 16 and having high temperature is divided by the auxiliary passage wall hole 11'. As a result, the temperature of the airflow around the resistor heater 14 lowers and the influence of the heat from the auxiliary passage wall 16 can be reduced.

In the example described with reference to FIG. 7, the auxiliary passage wall holes 9, 10 and 11' are each formed into a shape of a rectangular slit. However, those auxiliary passage wall holes may have an elliptic shape. Practical dimensions in such a case will be described below.

The auxiliary passage wall hole 9 is formed into an elliptic shape with a major radius of RL(9) and a minor radius of Rs(9). Assuming that the length of the air temperature detector 12 is L1(12) and the width of the auxiliary passage 6 is L3, the respective dimensions are set so as to satisfy the relationship of $L1(12) \leq RL(9) \leq L3$. The offset amount m1 is set to be in the range of −1 mm to +3 mm.

Also, the auxiliary passage wall hole 10 is formed into an elliptic shape with a major radius of RL(10) and a minor radius of Rs(10). Assuming that the length of the heat-sensitive resistor 13 is L1(13) and the width of the auxiliary passage 6 is L3, the respective dimensions are set so as to satisfy the relationship of $L1(13) \leq RL(10) \leq L3$. The offset amount m2 is set to be in the range of −1 mm to +3 mm.

Further, the auxiliary passage wall hole 11' is formed into an elliptic shape with a major radius of RL(11) and a minor radius of Rs(11). Assuming that the length of the resistor heater 14 is L1(14) and the width of the auxiliary passage 6 is L3, the respective dimensions are set so as to satisfy the relationship of $L1(13) \leq RL(11') \leq L3$. The offset amount n3 is set to be in the range of 0 mm to +5 mm.

When the auxiliary passage wall hole has a circular shape, the respective dimensions can be set by assuming the major radius RL(9)=the minor radius Rs(9), the major radius RL(10)=the minor radius Rs(10), and the major radius RL(11')=the minor radius Rs(11') in the above-described case in which the auxiliary passage wall hole has an elliptic shape.

With this embodiment, as described above, temperature characteristics of the flowmeter with the resistor heater can be improved only with the passage structure of the flowmeter without improving a flow rate measuring device of the flowmeter with the resistor heater and without adding a special electronic circuit for compensation.

Also, by modifying combination of the size and the position of the hole formed near each detecting device, temperature characteristics of the flowmeter with the resistor heater can be easily adjusted. Therefore, optimum temperature characteristics can be simply obtained regardless of the construction of the flowmeter with the resistor heater, as well as the shape and temperature conditions of the intake passage of the automobile internal combustion engine.

Further, the flowmeter with the resistor heater can be manufactured at a cost comparable to that of a conventional flowmeter with a resistor heater without changing the method of manufacturing the conventional flowmeter.

It is to be noted that the present invention is effective to not only the above-described measurement of an airflow, but also to measurement of other fluids, such as hydrogen, nitrogen or water.

INDUSTRIAL APPLICABILITY

According to the present invention, productivity of the flowmeter with the resistor heater can be improved.

The invention claimed is:

1. A flowmeter, comprising:
   a heat-sensitive resistor
   a heat-radiating device, controlled according to heat sensed by said heat-sensitive resistor, such that heat radiated by said heat-radiated device is representative of air flow rate, wherein said heat-sensitive resistor measures an ambient temperature to compensate for a heated temperature of said heat-radiating device,
   an auxiliary passage in which said heat-radiating device and said heat-sensitive resistor are arranged and through which a part of air flowing through an intake passage flows in and out, and
   a module housing defining said auxiliary passage;
   wherein the module housing has a sidewall extending in a direction of flow of said part of air flowing through said intake passage; and
   wherein a hole is formed in the sidewall of said module housing for communication of said auxiliary passage with said intake passage near each of or one of said heat-radiating device and said heat-sensitive resistor.

2. A flowmeter according to claim 1, further comprising:
   a temperature sensor arranged in said auxiliary passage and measuring a fluid temperature, and
   a hole formed in the sidewall of said module housing near said temperature sensor.

3. A flowmeter according to claim 2, wherein said heat-radiating device, said heat-sensitive resistor, and said temperature sensor are disposed inside said auxiliary passage closer to the sidewall of said module housing than to a central axis of said auxiliary passage.

4. A flowmeter according to claim 3, wherein each of said holes increases a flow speed of an airflow flowing around a corresponding one of said heat-radiating device, said heat-sensitive resistor, and said temperature sensor.

5. A flowmeter according to claim 4, wherein a central position of each of said holes is arranged within the range of −1 to +3 mm relative to a central axis of said heat-radiating in a downstream direction of said auxiliary passage.

6. A flowmeter according to claim 1, wherein each of said holes divides a temperature boundary layer generated in an airflow contacting with the sidewall of said module housing in said auxiliary passage.

7. A flowmeter according to claim 6, wherein a central position of each of said holes is arranged within the range of 0 to +5 mm relative to a central axis of said heat-radiating device in an upstream direction of said auxiliary passage.

8. A flowmeter according to claim 2, wherein, assuming that each of said heat-radiating device, said heat-sensitive resistor and said temperature sensor has a transverse width of L1 and said auxiliary passage has a rectangular sectional shape with a width of L3, a transverse width L2 of each of said holes satisfies $L1 \leq L2 \leq L3$.

9. A flowmeter, comprising:
   a heat-sensitive resistor,
   a heat-radiating device controlled according to heat sensed by said heat-sensitive resistor, such that heat radiated by said heat-radiated device is representative of air flow rate, wherein said heat-sensitive resistor measures an ambient temperature to compensate for a heated temperature of said heat-radiating device, an auxiliary passage in which said heat-radiating device and said heat-sensitive resistor are arranged, and a module housing defining said auxiliary passage, wherein said flowmeter is mounted to an intake passage by inserting said module housing into said intake passage, said auxiliary passage has an inlet for allowing air flow from said intake passage into said auxiliary passage and an outlet for allowing air flow from the inside of said auxiliary passage to said intake passage, a length of air flow axially through said auxiliary passage is greater than a length of air flow axially through said intake passage bypassing said auxiliary passage, the module housing has a sidewall extending in a direction of flow of said air flowing from said intake passage into said auxiliary passage; and a hole is formed in the sidewall of said module housing near each of or one of said heat-radiating device and said heat-sensitive resistor.

10. A flowmeter, comprising:

a resistor heater, a heat-sensitive resistor for measuring an ambient temperature to compensate a heated temperature of said resistor heater, an auxiliary passage in which said resistor heater and said heat-sensitive resistor are arranged and through which a part of air flowing through an intake passage flows in and out, and a module housing defining said auxiliary passage;

wherein the module housing has a sidewall extending in a direction of flow of said part of air flowing through said intake passage;

wherein a hole is formed in the sidewall of said module housing for communication of said auxiliary passage with said intake passage near each of or one of said resistor heater and said heat-sensitive resistor;

wherein a part of said module housing is inserted through an inserting hole of said intake passage, and said auxiliary passage is arranged in said intake passage; and wherein a sectional area of said inserting hole is smaller than a sectional area of said auxiliary passage.

11. A flowmeter according to claim 10, further comprising:

a temperature sensor arranged in said auxiliary passage and measuring a fluid temperature, and a hole formed in the sidewall of said module housing near said temperature sensor.

12. A flowmeter according to claim 11, wherein said resistor heater, said heat-sensitive resistor, and said temperature sensor are disposed inside said auxiliary passage closer to the sidewall of said module housing than to a central axis of said auxiliary passage.

13. A flowmeter according to claim 12, wherein each of said holes increases a flow speed of an airflow flowing around a corresponding one of said resistor heater, said heat-sensitive resistor, and said temperature sensor.

14. A flowmeter according to claim 13, wherein a central position of each of said holes is arranged within the range of −1 to +3 mm relative to a central axis of said resistor heater in a downstream direction of said auxiliary passage.

15. A flowmeter according to claim 11, wherein, assuming that each of said resistor heater, said heat-sensitive resistor and said temperature sensor has a transverse width of L1 and said auxiliary passage has a rectangular sectional shape with a width of L3, a transverse width L2 of each of said holes satisfies L1 ≦L2 ≦L3.

16. A flowmeter according to claim 10, wherein each of said holes divides a temperature boundary layer generated in an airflow contacting with the sidewall of said module housing in said auxiliary passage.

17. A flowmeter according to claim 16, wherein a central position of each of said holes is arranged within the range of 0 to +5 mm relative to a central axis of said resistor heater in an upstream direction of said auxiliary passage.

* * * * *